(12) United States Patent
    Panisset

(10) Patent No.: US 7,744,212 B2
(45) Date of Patent: Jun. 29, 2010

(54) SPECTACLES WITH INTERCHANGEABLE TEMPLES

(75) Inventor: Claude Panisset, Morbier (FR)

(73) Assignee: Oxibis Exalto SAS, Morbier (FR)

( * ) Notice: Subject to any disclaimer, the term of this patent is extended or adjusted under 35 U.S.C. 154(b) by 31 days.

(21) Appl. No.: 11/989,390

(22) PCT Filed: Sep. 22, 2006

(86) PCT No.: PCT/FR2006/002178

§ 371 (c)(1),
(2), (4) Date: Jan. 25, 2008

(87) PCT Pub. No.: WO2007/042633

PCT Pub. Date: Apr. 19, 2007

(65) Prior Publication Data

US 2009/0122255 A1    May 14, 2009

(30) Foreign Application Priority Data

Oct. 11, 2005    (FR) .................................... 05 10622

(51) Int. Cl.
    *G02C 5/14*    (2006.01)
(52) U.S. Cl. .......................... 351/116; 351/153; 16/228

(58) Field of Classification Search .................... 351/41, 351/121, 153, 111, 116; 16/228
    See application file for complete search history.

(56) References Cited

U.S. PATENT DOCUMENTS

| 4,153,347 A |   | 5/1979  | Myer et al. |
| 5,418,581 A | * | 5/1995  | Conway ..................... 351/116 |
| 5,980,039 A |   | 11/1999 | Schmid et al. |
| 6,050,686 A |   | 4/2000  | De Rossi et al. |

FOREIGN PATENT DOCUMENTS

| FR | 1 037 166 | 9/1953 |
| GB | 734 208   | 7/1955 |

* cited by examiner

*Primary Examiner*—Huy K Mai
(74) *Attorney, Agent, or Firm*—Bachman & LaPointe, P.C.

(57) ABSTRACT

Spectacles consist of an optical or sunshade front optionally supported by a frame and comprising two interchangeable temples. Each temple is connected to the front or to the frame by a male part and an associated joint. In the spectacles, the joint of each temple consists of at least one pin arranged transversely in a corresponding longitudinal slot formed at one end of a free temple. The pin can be snapped into an elastically deformable recess formed in a plate projecting from the male part, the shape and dimensions of which are approximately the same as those of the slot of the temple, or vice versa.

9 Claims, 3 Drawing Sheets

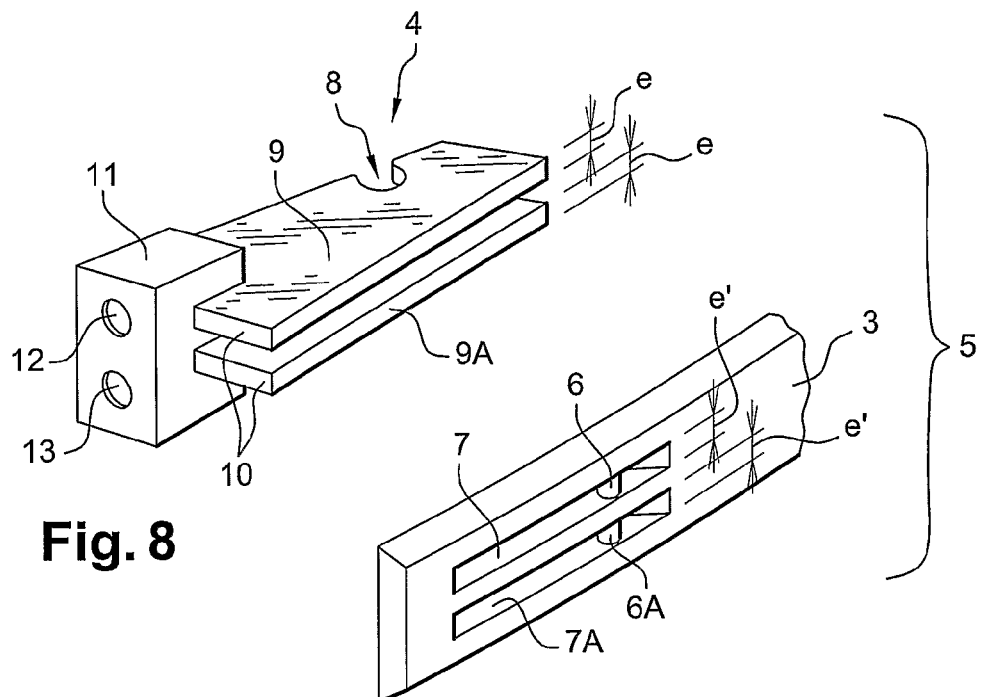
Fig. 8
Fig. 9
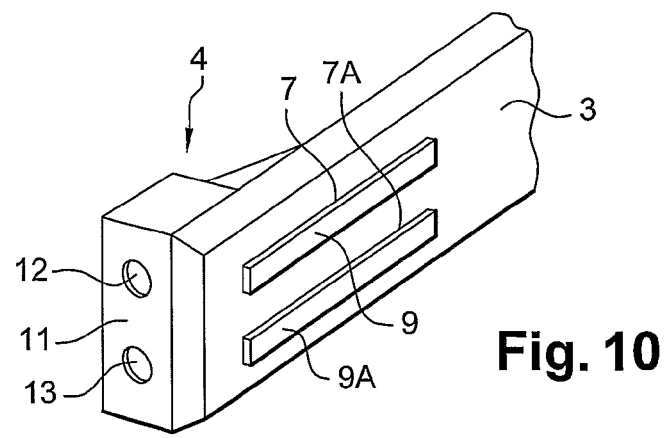
Fig. 10

SPECTACLES WITH INTERCHANGEABLE TEMPLES

BACKGROUND (1) Field of the Invention

This invention relates to spectacles of the type consisting of an optical or sunshade front optionally supported by a frame and comprising two interchangeable temples, each temple being connected to the front or to the frame by a male part and an associated joint.

(2) Prior Art

Generally and as in the prior art, the joint pin used in spectacles temples consists of a screw that connects together the two parts of a hinge forming the joint.

However, a problem well known to opticians is that this screw forming the pin of the joint very often becomes loose and has to be retightened—if the looseness has not resulted in the loss of the temple concerned.

This problem is aggravated if it is wished to make the temples easily interchangeable without the user having to visit a specialist but being able to change the temples himself.

SUMMARY OF THE INVENTION

It is an object of this invention to solve all these problems and it therefore relates to spectacles of the type consisting of an optical or sunshade front optionally supported by a frame and comprising two interchangeable temples, each temple being connected to the front or to the frame by a male part and an associated joint, in which spectacles the joint of each of the temples consists of at least one pin arranged transversely in a corresponding longitudinal slot formed at one end of a free temple, which pin can be snapped into an elastically deformable recess formed in a plate projecting from the male part, the shape and dimensions of which are approximately the same as those of the slot of the temple, in such a way that the plate of the male part slides into the slot of the temple, and also in such a way that the joint pin guides the temple as it rotates and keeps it in a stable position when folded, in order to provide a screwless joint that makes the temples easily interchangeable.

Such spectacles according to the invention bring together a number of advantages, namely: there are no screws to work loose; each of the parts of the joint can if desired be molded in plastic, and so there is no intermediate part; the temple is fitted and removed by a simple hand action, no tool being required; and the temples are infinitely interchangeable, allowing the customer any desired combination of colors and shapes.

The invention relates additionally to the features which will be set out in the course of the following description, and which should be considered in isolation or in any possible technical combination.

BRIEF DESCRIPTION OF THE DRAWINGS

This description, given by way of non-restrictive example, will explain more clearly how the invention can be carried out with reference to the attached drawings, in which:

FIG. 8 is a perspective view of a male part of a joint in accordance with the invention;

FIG. 9 is a perspective view of the end of a temple forming the complementary joint region of the male part seen in FIG. 8; and FIG. 10 is a perspective view of an assembled joint comprising a male part as seen in FIG. 8 and an end of a temple as seen in FIG. 9.

DETAILED DESCRIPTION OF THE PREFERRED EMBODIMENT(S)

Figure 1:
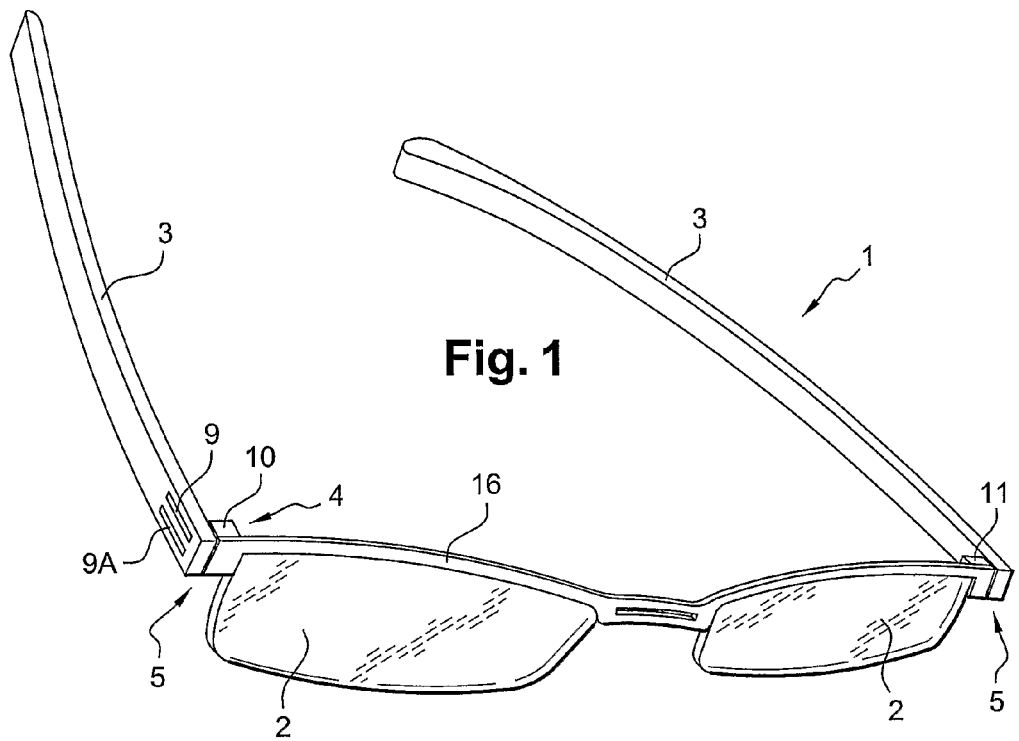
FIG. 1 is a perspective view of a pair of spectacles consisting of a front surrounded at least partly by a frame, with two side temples connected together by a joint in a first illustrative embodiment of the invention.

The spectacles, which are given the general reference 1 in the figures, consist of an optical or sunshade front 2 optionally supported by a frame and comprising two interchangeable temples 3, each temple being connected to the front 2 or to the frame 16 by a male part 4 and an associated joint 5.

In accordance with the invention, the joint 5 of each temple 3 consists of at least one pin 6, 6A arranged transversely in a corresponding longitudinal slot 7, 7A formed at one end of a free temple 3, which pin 6, 6A can be snapped into an elastically deformable recess 8, 8A formed in a plate 9, 9A projecting from the male part 4, the shape and dimensions of the plates are approximately the same as those of the slot 7 of the temple 3. In this way the plate 9, 9A of the male part 4 slides into the slot 7, 7A of the temple 3, and the joint pin 6, 6A also guides the temple 3 as it rotates and keeps it in a stable position when folded, in order to provide a screwless joint that makes the arms easily interchangeable.

Of course, the opposite is also true and possible, that is to say, the slot 7 could very well be formed in the male part 4 and the plates 9 on the temple 3.

For preference, in the present embodiment, the joint 5 of each of the temples 3 consists of two transverse pins 6, 6A are aligned with each other, in two corresponding longitudinal slots 7, 7A mutually parallel and identical and formed in the temple 3, which pins 6, 6A snap elastically into two recesses 5, 5A formed in two mutually parallel and identical guide plates 9, 9A projecting from the male part 4, the shape and dimensions of the plates being approximately the same as those of the two slots 7, 7A of the temple 3 into which they slide.

Continuing with the present embodiment, used here as an example, the guide plates 9, 9A of the male part 4 and the corresponding slots 7, 7A of the temples 3 are rectangular parallelepipeds whose dimensions, especially their respective thicknesses "e", "e'", have approximately equal values, with a manufacturing tolerance such as to obtain a so-called sliding fit.

Figure 3:
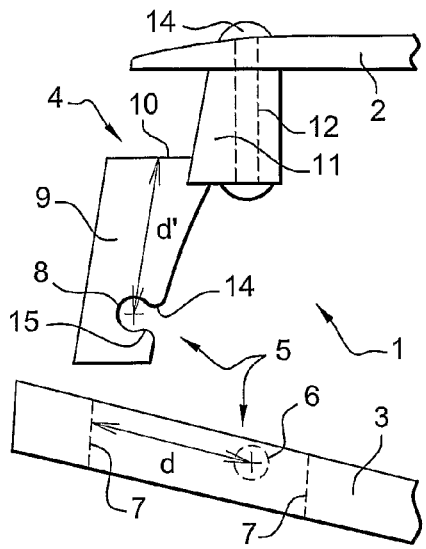
FIG. 3 is an enlarged view of a portion of spectacles with holes in the area of its joint corresponding to one end of the front, and to one end of a corresponding temple, before the one is joined to the other.
Figure 4:
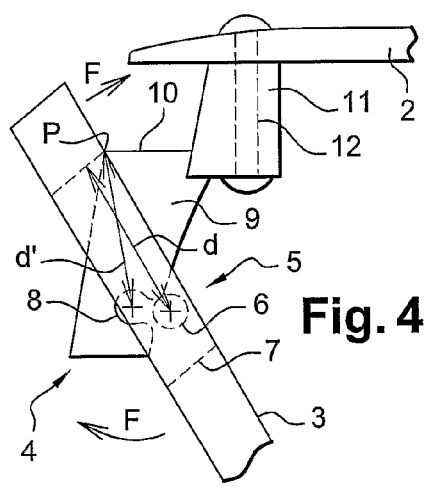
FIG. 4 shows the region of one of the joints of the spectacles seen in FIG. 3, in a position where the temple is being presented to the male part, before being snapped into position.
Figure 5:
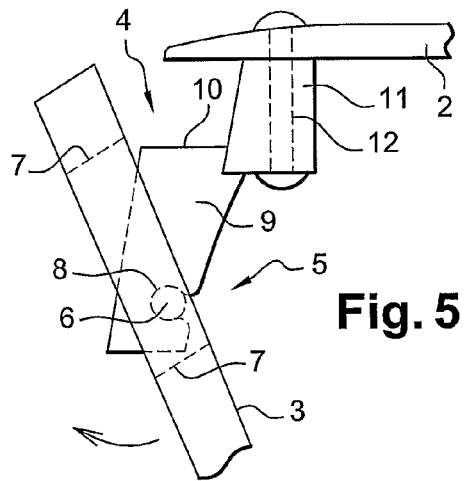
FIG. 5 shows the region of one of the joints of the spectacles seen in FIG. 4, after the temple has been snapped into position on the male part.
Figure 6:
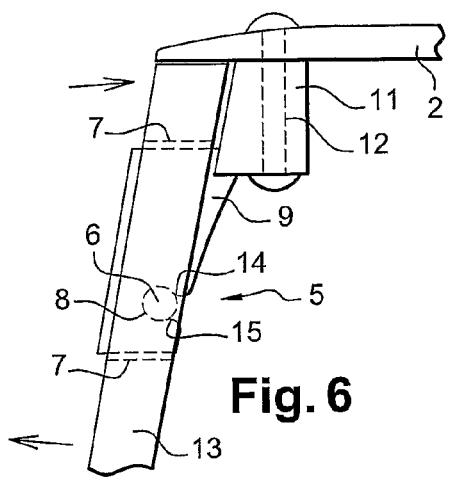
FIG. 6 is a view of a joint in accordance with the preceding figures, once the temple has been snapped into position, the temple being in the open position.
Figure 7:
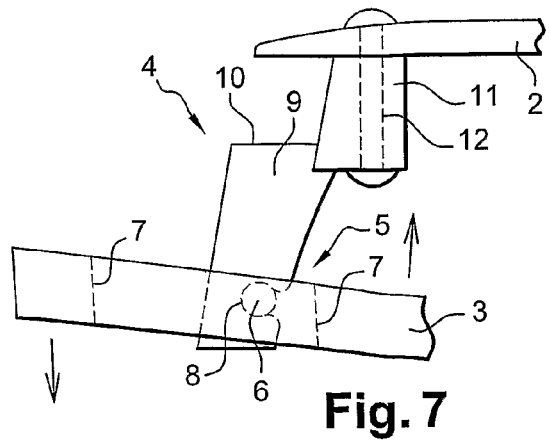
FIG. 7 is a view of a joint as seen in the preceding figures, with the temple snapped into position and in the closed position.

As can be seen especially clearly in FIGS. 3 and 4, the distance "d" between the pin 6, 6A of the temple 3 and the rear end of its slot 7, 7A, in the direction of the male part 4, is less than the distance "d'" between the recess 8, 8A of the same male part 4 and a rear part or shoulder 10 of the latter, when the recess 8, 8A of the male part 4 is presented to the pin 6, 6A of the temple 3, for their snap engagement, in such a way that the shoulder 10 of the male part 4 finds a bearing surface P in the end part of the slot 7, 7A of the temple 3, so as to exert upon the latter the force F necessary for their snap engagement and thereafter allow the temple and the male part to pivot freely relative to each other, once in the position of use.

Furthermore, in the present illustrative embodiment, the guide plates 9, 9A are continued by a generally parallelepiped-shaped block 11, together forming the male part 4, said block 11 being pierced by two holes 12, 13 designed to receive two fixing means 14 for fixing it directly to the optical or sunshade front 2.

This fixing means may take the form of a rivet or a screw.

Figure 2:
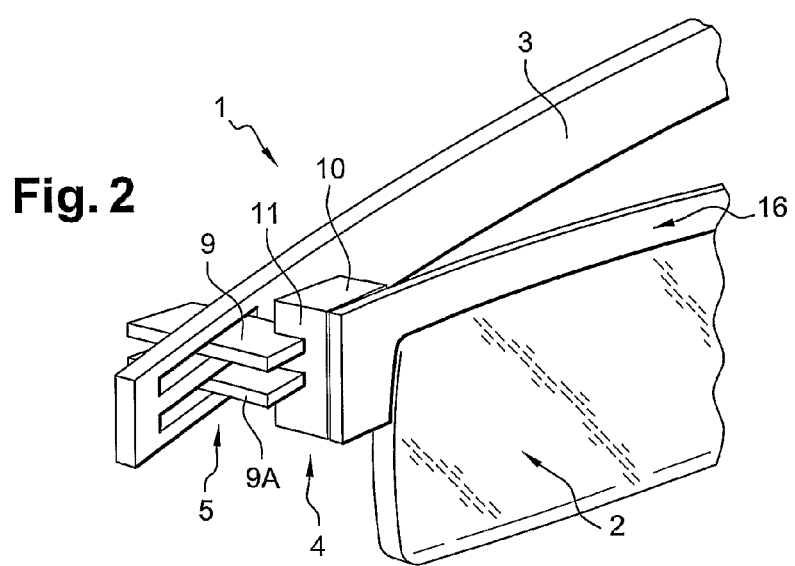
FIG. 2 is a view of details on an enlarged scale of the joint seen in FIG. 1.

In an embodiment shown in FIGS. 1 and 2, the guide plates 9, 9A project from a male part 4 produced in the same plastics molding operation as the frame 16.

The slots 7, 7A of the temples 3, and the joint pins 6, 6A that extend through them, are advantageously produced in the same molding operation as said temples 3.

In another feature of the invention, the recesses 8, 8A formed in the guide plates 9, 9A of the male part 4 consist partly of parts of circular section, of approximately the same diameter as the joint pins 6, 6A of the temple 3 to which the recesses can be connected, and partly of an open part bounded by two protrusions 14, 15 separated by a distance less than the diameter of the pins 6, 6A, so that the pins 6, 6A are locked when snapped elastically into the recesses 8, 8A.

The temples 3 and the male parts 4 are advantageously made of plastic.

Because of the excellent results obtained, the plastic used is preferably grilamide, more generally a member of the polyamide family.

With the invention described above, therefore, production costs are greatly reduced and at the same time there is better control of the coefficients of friction of the parts against each other, these advantages being added to the fact that the joint requires no screws but allows interchanging of a broken temple as well as color mixing to combine the colors for the purpose of personalizing the spectacles and making them more distinctive.

The invention can therefore be adapted to spectacles with so-called rimless lenses 2, where the male parts 4 are fixed directly to the lenses 2, or to spectacles with frames 16, where the male parts 4 are produced directly with said frame 16 or with the temples 3.

The invention claimed is:

1. Spectacles comprising:
an optical or sunshade front optionally supported by a frame;
two interchangeable temples;
each said temple being connected to the front or to the frame by a male part and an associated joint;
each said temple having two longitudinally extending slots formed in a sidewall and a pin transversely positioned in each of said slots;
male parts projecting from said front or said frame;
two plates projecting from each of said male parts;
each said plate having an elastically deformable recess formed therein, wherein said associated joint is a screwless joint for each said temple consisting of said pins being snapped into said elastically deformable recesses formed in said plates projecting from a respective one of said male parts, said plates each having a shape and dimensions which are approximately the same as those of the slots of a respective one of the temples so that each of said plates slides into one of the slots of the respective temple and so that the joint pins guide the respective temple as the respective temple rotates and keeps the respective temple in a stable position when folded, whereby said screwless joint makes the temples interchangeable.

2. The spectacles as claimed in claim 1, in which the two transverse pins forming the associated joint are aligned with each other, in which the two corresponding longitudinal slots are mutually parallel and identical, in which said plates comprise two mutually parallel and identical guide plates projecting outwardly from the male part, in which the pins snap elastically into the two recesses formed in the two mutually parallel and identical guide plates projecting from the male part, and in which the shape and dimensions of said plates being approximately the same as those of the two temple slots into which they slide.

3. The spectacles as claimed in claim 1, in which the guide plates of the male part and the corresponding slots of the temples are rectangular parallelepipeds whose dimensions, including respective thicknesses, have approximately equal values, with a manufacturing tolerance which provides a sliding fit.

4. The spectacles as claimed in claim 1, wherein a first distance between a respective pin of the temple and a rear end of the slot receiving said respective pin in the direction of the male part is less than a second distance between the recess of the same male part and a rear part or shoulder of the male part, when the recess of the male part is presented to the pin of the temple for snap engagement, in such a way that the shoulder of the male part finds a bearing surface in an end part of the slot of the temple, so as to exert upon the temple a force needed for the snap engagement and thereafter allow the temple and the male part to pivot freely relative to each other when in the position of use.

5. The spectacles as claimed in claim 1, wherein the guide plates are continued by a generally parallelepiped-shaped block, together forming the male part, said block being pierced by two holes for receiving two fixing means for fixing said block directly to the optical or sunshade front.

6. The spectacles as claimed in claim 1, wherein the guide plates project from a male part produced in the same plastics molding operation as the frame.

7. The spectacles as claimed in claim 1, wherein the slots of the temples, and the joint pins that extend through the slots, are produced in the same molding operation as said temples.

8. The spectacles as claimed in claim 1, wherein the recesses formed in the guide plates of the male part consist of parts of circular section, of approximately the same diameter as the joint pins of the temple to which the recesses can be connected, and partly of an open part bounded by two protrusions separated by a distance less than the diameter of the pins, so that the pins are locked when snapped elastically into the recesses.

9. The spectacles as claimed in claim 1, wherein the temples and the male parts are made of plastic.

* * * * *